US011468084B2

(12) United States Patent
Egami et al.

(10) Patent No.: US 11,468,084 B2
(45) Date of Patent: Oct. 11, 2022

(54) INFORMATION PROCESSING DEVICE, AND IMAGE DATA GENERATING DEVICE

(71) Applicant: OMRON Corporation, Kyoto (JP)

(72) Inventors: Shin Egami, Takatsuki (JP); Kazuki Kasai, Tokyo (JP); Tomohiro Taguchi, Tokyo (JP)

(73) Assignee: OMRON Corporation, Kyoto (JP)

(*) Notice: Subject to any disclaimer, the term of this patent is extended or adjusted under 35 U.S.C. 154(b) by 43 days.

(21) Appl. No.: 17/253,150

(22) PCT Filed: Mar. 11, 2019

(86) PCT No.: PCT/JP2019/009741

§ 371 (c)(1),
(2) Date: Dec. 17, 2020

(87) PCT Pub. No.: WO2020/021758

PCT Pub. Date: Jan. 30, 2020

(65) Prior Publication Data

US 2021/0248156 A1 Aug. 12, 2021

(30) Foreign Application Priority Data

Jul. 26, 2018 (JP) ............................ JP2018-140425

(51) Int. Cl.
*G06F 16/26* (2019.01)
*G06F 16/2455* (2019.01)
(Continued)

(52) U.S. Cl.
CPC ............ *G06F 16/26* (2019.01); *G06F 3/0481* (2013.01); *G06F 16/2455* (2019.01); *G06Q 30/0201* (2013.01)

(58) Field of Classification Search
CPC .... G06F 16/26; G06F 16/2455; G06F 3/0481; G06Q 30/0201
(Continued)

(56) References Cited

U.S. PATENT DOCUMENTS 11,089,107 B1 * 8/2021 Chor ........................ H04L 63/08
2009/0105984 A1 * 4/2009 Wen ........................ G06F 16/26
707/999.102

(Continued)

FOREIGN PATENT DOCUMENTS

JP H10-290787 A 11/1998
JP 2015-515041 A 5/2015
JP 2016-51426 A 4/2016

OTHER PUBLICATIONS

An English translation of the International Search Report ("ISR") of PCT/JP2019/009741 dated May 21, 2019.

(Continued)

*Primary Examiner* — Hanh B Thai
(74) *Attorney, Agent, or Firm* — Metrolex IP Law Group, PLLC

(57) ABSTRACT

An information processing device for processing target data according to one or more embodiments may include a preprocessor and a preprocess ID assigner. The preprocessor may be configured to generate preprocessed data by performing at least one preprocess on the target data. The preprocess ID assigner may be configured to assign, to the preprocessed data, a preprocess ID corresponding to the at least one preprocess.

5 Claims, 8 Drawing Sheets

(51) Int. Cl.
*G06F 3/0481* (2022.01)
*G06Q 30/02* (2012.01)

(58) Field of Classification Search
USPC .......................................................... 707/736
See application file for complete search history.

(56) References Cited

U.S. PATENT DOCUMENTS

| | | | | |
|---|---|---|---|---|
| 2010/0293108 | A1* | 11/2010 | Gurvitch | G06Q 40/04 705/37 |
| 2013/0097093 | A1* | 4/2013 | Kolber | G06Q 10/1053 705/321 |
| 2013/0191078 | A1* | 7/2013 | Batra | G06F 30/15 703/1 |
| 2016/0335395 | A1 | 11/2016 | Wu et al. | |
| 2017/0068643 | A1* | 3/2017 | Shamir | G06F 16/48 |
| 2017/0076300 | A1* | 3/2017 | Cavalcanti | G06Q 30/02 |
| 2017/0116690 | A1* | 4/2017 | Berry | G06F 16/221 |
| 2017/0357721 | A1* | 12/2017 | Chernenkov | G06F 16/951 |
| 2018/0068470 | A1* | 3/2018 | Croft | G06F 16/26 |
| 2018/0096040 | A1* | 4/2018 | Iida | G06F 16/00 |
| 2020/0065614 | A1* | 2/2020 | Nishimura | A61B 1/0005 |

OTHER PUBLICATIONS

The Written Opinion("WO") of PCT/JP2019/009741 dated May 21, 2019.

"To whom use a smartphones [online]", Tokyo Metropolitan Police Department, Nov. 17, 2017, [Searched Date: May 13, 2019], Internet <URL :http://www.keishicho.metro.tokyo.jp/smph/kurashi/cyber/security/cyber414.html>, Machine translation retrieved on Dec. 8, 2020, Relevance is indicated in the (translated) ISR/WO dated on May 21, 2019.

* cited by examiner

Fig. 3

| TimeStamp | Individual ID | IoT device ID | Face point group | IoT device ID | Data ID |
|---|---|---|---|---|---|
| 2018-06-14 10:48:23 | egaom03 | Smiley face determination for PC | (10,30,40,1,,) | Laboratory PC | Processing emails |
| 2018-06-14 10:48:24 | egaom03 | Smiley face determination for PC | (11,32,49,0,,) | Laboratory PC | Processing emails |
| 2018-06-14 10:48:25 | egaom03 | Smiley face determination for PC | (12,35,50,1,,) | Laboratory PC | Processing emails |
| 2018-06-14 10:48:26 | egaom03 | Smiley face determination for PC | (11,52,40,1,,) | Laboratory PC | Used in meeting |
| 2018-06-14 10:48:27 | egaom03 | Smiley face determination for PC | (10,92,45,0,,) | Laboratory PC | Used in meeting |
| ⋮ | ⋮ | | | | |

Fig. 4

| TimeStamp | Individual ID | IoT device ID | Face point group | Face determination | Preprocess ID | IoT device ID | Data ID |
|---|---|---|---|---|---|---|---|
| 2018-06-14 10:48:23 | egaom03 | Smiley face determination for PC | (10,30,40,1,,) | Smile | Smiley face determination algorithm | Laboratory PC | Processing emails |
| 2018-06-14 10:48:24 | egaom03 | Smiley face determination for PC | (11,32,49,0,,) | Smile | Smiley face determination algorithm | Laboratory PC | Processing emails |
| 2018-06-14 10:48:25 | egaom03 | Smiley face determination for PC | (12,35,50,1,,) | Smile | Smiley face determination algorithm | Laboratory PC | Processing emails |
| 2018-06-14 10:48:26 | egaom03 | Smiley face determination for PC | (11,52,40,1,,) | Anger | Smiley face determination algorithm | Laboratory PC | Used in meeting |
| 2018-06-14 10:48:27 | egaom03 | Smiley face determination for PC | (10,92,45,0,,) | Anger | Smiley face determination algorithm | Laboratory PC | Used in meeting |
| ⋮ | ⋮ | | | | | | |

Fig. 5A

| Individual ID | IoT device ID | Data ID | Preprocess ID | Visualization ID |
|---|---|---|---|---|
| egaom03 | Smiley face determination for PC | (Face point group, data ID) | Smiley face determination algorithm | Emotion trend visualization app |
| egaom03 | Laboratory PC | (Data ID) | (None) | Task history visualization app |
| ⋮ | ⋮ | ⋮ | ⋮ | ⋮ |

Fig. 5B

| Individual ID | Service ID | Data ID | Preprocess ID | Service trigger |
|---|---|---|---|---|
| egaom03 | Increase job motivation service | (Face point group, data ID) | Smiley face determination algorithm | Off |
| egaom03 | Time management assistance service | (Data ID) | (None) | On |
| egaom03 | ⋮ | ⋮ | | ⋮ |
| ⋮ | ⋮ | ⋮ | | ⋮ |

INFORMATION PROCESSING DEVICE, AND IMAGE DATA GENERATING DEVICE

FIELD

The present invention relates to an information processing device, an image data generating device, an information processing system, an information processing method, and a program.

BACKGROUND

Information processing systems have been developed to collect data for Internet of Things (IoT) data analysis to provide the data to various service providers. One such system performs preprocesses on data including data interpolation and sampling before providing the data to a service provider (refer to, for example, Patent Literature 1).

CITATION LIST

Patent Literature

Patent Literature 1: Japanese Unexamined Patent Application Publication (Translation of PCT Application) No. 2015-515041 (published on May 21, 2015)

SUMMARY

Technical Problem

However, service providers that provide a service to users using IoT data and users that use such a service cannot trace IoT data back to its source or information about any preprocess performed on the data. Business operators that provide IoT data or preprocess data have no information about use of such data. The ownership of such data remains unclear.

In response to the above issue, one or more aspects of the present invention are directed to a technique for tracking data records to create a new competitive market that provides more value to business operators that perform data preprocesses to allow abundant preprocessed data to be provided to service providers, thus providing abundant IoT services to users.

Solution to Problem

An information processing device according to an aspect of the present invention is an information processing device for processing target data. The device includes a preprocessor that generates preprocessed data by performing at least one preprocess on the target data, and a preprocess ID assigner that assigns, to the preprocessed data, a preprocess ID corresponding to the at least one preprocess.

An information processing device according to another aspect of the present invention is an information processing device for visualizing target data. The device includes a visualization unit that generates visualized data by performing at least one visualization process on the target data, and a visualization process ID assigner that assigns, to the visualized data, a visualization process ID (also referred to as a visualization ID) corresponding to the at least one visualization process.

An information processing device according to another aspect of the present invention is an information processing device for controlling use of an application. The device includes a first data ID obtainer that obtains a first data ID being an ID of first data referenced by a visualization application for visualizing data, a second data ID obtainer that obtains a second data ID being an ID of second data referenced by a service application provided to a user, and an output unit that outputs information indicating that the service application that references the second data is usable in response to a match between the first data ID and the second data ID.

An information processing system according to another aspect of the present invention includes a visualization ID assigner, and an application use controller that controls use of an application. The visualization ID assigner includes a visualization unit that generates visualized data by performing at least one visualization process on target data, and a visualization process ID assigner that assigns, to the visualized data, a visualization process ID corresponding to the at least one visualization process. The application use controller includes a first data ID obtainer that obtains a first data ID being an ID of first data referenced by the visualization ID assigner, a second data ID obtainer that obtains a second data ID being an ID of second data referenced by a service application provided to a user, and an output unit that outputs information indicating that the service application that references the second data is usable in response to a match between the first data ID and the second data ID.

An information processing method according to another aspect of the present invention is an information processing method for processing target data.

The method includes generating preprocessed data by performing at least one preprocess on the target data, and assigning, to the preprocessed data, a preprocess ID corresponding to the at least one preprocess.

An information processing method according to another aspect of the present invention is an information processing method for visualizing target data. The method includes generating visualized data by performing at least one visualization process on the target data, and assigning, to the visualized data, a visualization process ID corresponding to the at least one visualization process.

An image data generating method according to another aspect of the present invention is an image data generating method for generating image data. The method includes obtaining application information indicating an application to display, obtaining information indicating a candidate for data referenced by the application, and generating one or more display screens including a list of application icons indicating the application information and a list of data candidates indicating the data candidate information.

A program according to another aspect of the present invention is a program for causing a computer to function as the information processing device according to one of the above aspects. The program causes the computer to function as the preprocessor and the preprocess ID assigner.

A program according to another aspect of the present invention is a program for causing a computer to function as the information processing device according to one of the above aspects. The program causes the computer to function as the visualization unit and the visualization process ID assigner.

A program according to another aspect of the present invention is a program for causing a computer to function as the image data generating device according to one of the above aspects. The program causes the computer to function as the application information obtainer, the data candidate information obtainer, and the display screen generator.

Advantageous Effects

The technique according to the above aspects enables the tracking of data records.

BRIEF DESCRIPTION OF THE DRAWINGS

FIG. 3 is a diagram illustrating a raw data table recorded in a raw data database (DB).

FIG. 4 is a diagram illustrating an analysis data table recorded in an analysis DB.

FIG. 5A is a diagram illustrating a data management table for a visualization device recorded in a user IoT data management DB, and FIG. 5B is a data management table for a service providing device recorded in the DB.

DETAILED DESCRIPTION

One or more embodiments of the present invention (hereafter, the present embodiment) will now be described with reference to the drawings.

1. Example Use

Figure 2:
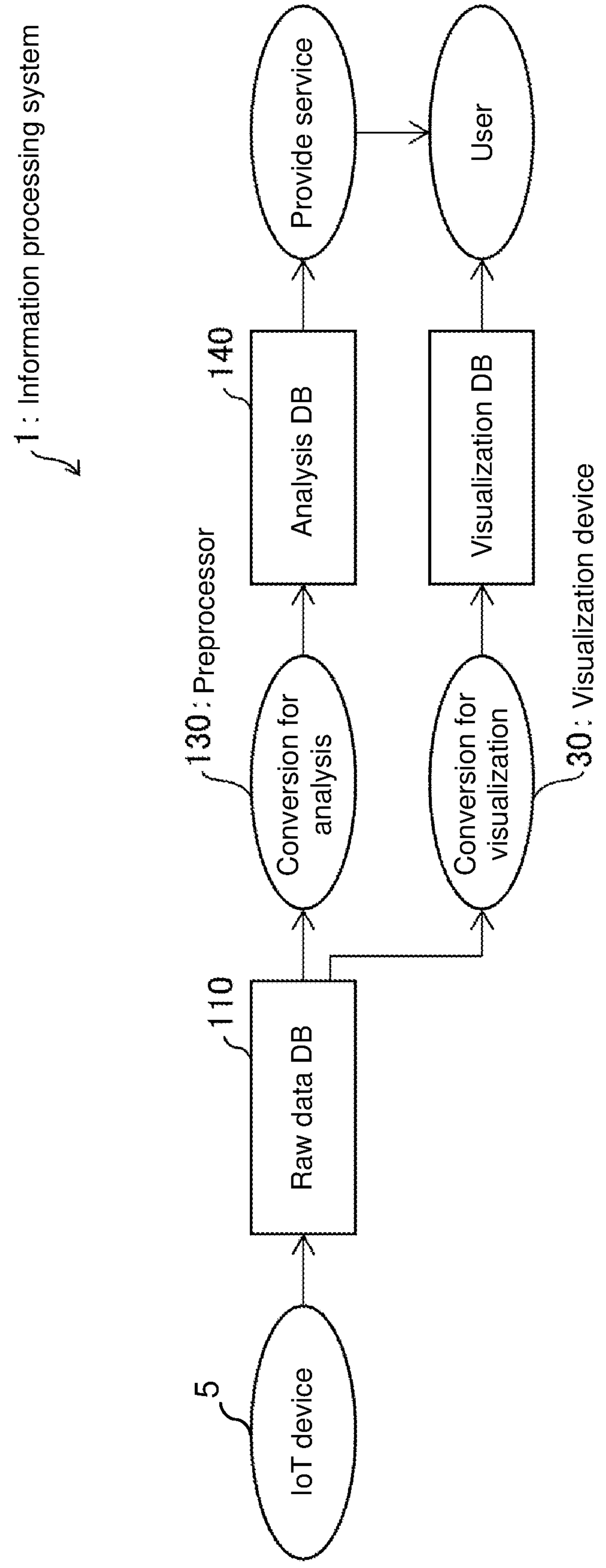
FIG. 2 is a diagram illustrating an overview of the service provided by the information processing system.

An example use according to an embodiment will be described with reference to FIG. 2. FIG. 2 is a diagram illustrating an overview of the service provided by an information processing system 1 according to the present embodiment. As shown in FIG. 2, the information processing system 1 is used to provide a service to a user, including collecting raw data from various Internet of Things (IoT) devices 5, visualizing the collected raw data, and preprocessing the collected raw data by, for example, converting the raw data for analysis.

The information processing system 1 includes the IoT devices 5, a raw data database (DB) 110, a preprocessor 130, an analysis DB 140, and a visualization device 30.

Each IoT device 5 obtains raw data, including a face image of a user, a schedule, an email history, a file browsing history, pulses, and driving data. Each IoT device 5 assigns, to the obtained raw data, an IoT device ID for identifying the corresponding IoT device.

The raw data DB 110 collects the raw data obtained by one or more IoT devices 5 and stores the raw data. The raw data DB 110 assigns a unique data ID to each piece of data obtained from each IoT device 5 and stores the raw data. The raw data DB 110 may also assign, to the obtained raw data, an individual ID for identifying the user of the corresponding IoT device 5 before storing the raw data.

The preprocessor 130 preprocesses the raw data collected in the raw data DB 110 with an algorithm corresponding to the raw data. Also, the preprocessor 130 assigns, to the preprocessed data, a preprocess ID corresponding to the preprocess performed on the raw data.

The analysis DB 140 stores the data preprocessed by the preprocessor 130.

The visualization device 30 visualizes the raw data collected in the raw data DB 110 as a graph or in another form. The visualization device 30 may include a visualization DB for storing visualized data. The visualization device 30 also assigns, to the visualized data, a visualization ID corresponding to the visualization process performed on the raw data.

The information processing system 1 provides, to the user, the data visualized by the visualization device 30. The information processing system 1 also provides, to the user, a service with a service application for referencing the preprocessed data stored in the analysis DB 140.

The information processing system 1 allows determination as to whether the service application is usable in accordance with at least one of the IoT device ID, the individual ID, the preprocess ID, or the visualization ID associated with the data referenced by the service application provided to the user.

In this manner, the information processing system 1 can thus track data records by referencing an assigned ID corresponding to the processing performed on the raw data collected from one or more IoT devices 5 into the raw data DB 110.

Also, the ID corresponding to the processing performed by the information processing system 1 assigned to the data referenced by the service application allows the user or the application provider of the service application to track data records.

Also, the information processing system 1 associated with the data referenced by the service application allows determination as to whether the service application is usable in accordance with the ID indicating the processing performed on the data. This allows the user to view the details of the service when using or cancelling the service.

2. Example Configuration

Figure 1:
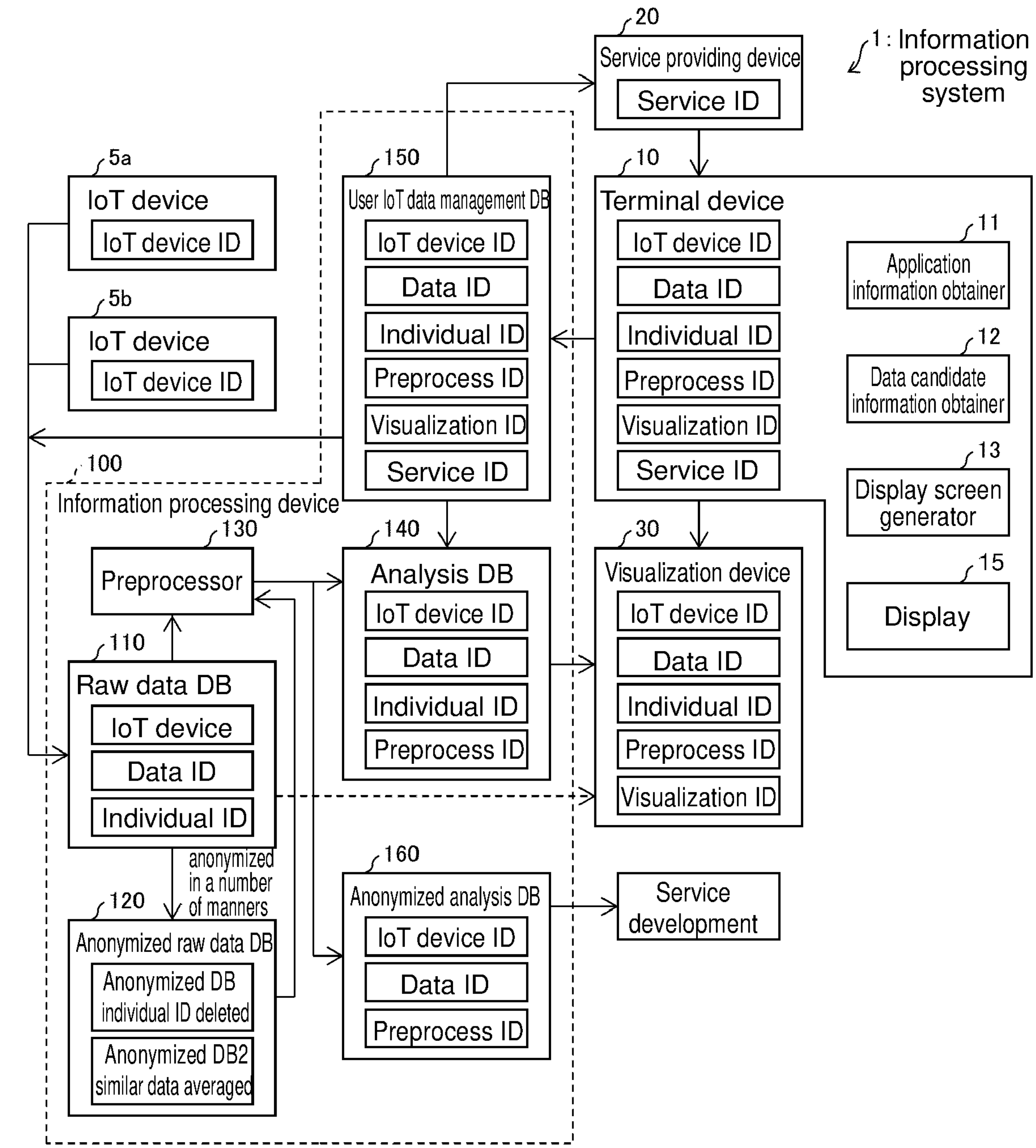
FIG. 1 is a schematic block diagram illustrating an information processing system according to one or more embodiments.

The configuration of an information processing device 100 according to an embodiment of the present invention will now be described in detail with reference to FIGS. 1 and 2. FIG. 1 is a schematic block diagram of the information processing device 100. FIG. 2 is a diagram illustrating an overview of the service provided by the information processing system 1 including the information processing device 100.

As shown in FIG. 1, the information processing device 100 is included in the information processing system 1. The information processing system 1 includes one or more IoT devices 5 (5*a*, 5*b*), the information processing device 100, the visualization device 30, a service providing device 20, and a terminal device 10.

The IoT devices 5 are electronic devices, such as smartphones, tablets, or other terminal devices, personal computers, smart speakers, and in-vehicle devices. Also, the IoT devices 5 may be sensors. Each IoT device 5 obtains raw data including a face image of a user, a schedule, an email history, a file browsing history, pulses, body temperature, driving data, and other sensing data, and provides the raw data to the information processing device 100. Each of the IoT devices 5 has a different IoT device ID. Each IoT device 5 assigns the IoT device ID to its obtained raw data and provides the raw data to the information processing device 100. In this manner, the IoT device 5 functions as a data generating device that generates data for processing performed by the information processing device 100.

Configuration of Information Processing Device 100

The information processing device 100 includes the raw data DB 110, an anonymized raw data DB 120, the preprocessor 130, the analysis DB 140, an anonymized analysis DB 160, and a user IoT data management DB 150. The information processing device 100 performs processing on target data. The information processing device 100 may include the preprocessor 130 alone. The raw data DB 110, the anonymized raw data DB 120, the analysis DB 140, the anonymized analysis DB 160, and the user IoT data management DB 150 may be separate from the information processing device 100.

The raw data DB 110 collects the raw data provided by one or more IoT devices 5 and stores the raw data. The raw data DB 110 assigns, to a piece of raw data provided by each IoT device 5, the data ID indicating an attribute of the piece of raw data. Also, the raw data DB 110 assigns, to each piece of raw data, an individual ID for identifying an individual associated with the piece of data.

The raw data DB 110 may associate information, such as data for recognizing an individual from a face image, the name of the individual, and the IoT device ID of the IoT device 5 owned by the individual, with the individual ID, and prestore the associated information. Also, the raw data DB 110 may reference information included in the raw data provided by each IoT device 5, determine the individual associated with the raw data, and assign the individual ID to the raw data.

The individual ID may be assigned to data transmitted to the raw data DB 110 by the user IoT data management DB 150 (described later) in accordance with the IoT device ID of the IoT device 5 or the data ID, and stored into the raw data DB 110. Also, the information, including data for recognizing an individual from a face image, the name of the individual, and the IoT device ID of the IoT device 5 owned by the individual, may be prestored in the user IoT data management DB 150. The raw data DB 110 may reference the information stored in the user IoT data management DB 150 and assign the individual ID to the raw data.

FIG. 3 is an example raw data table storing raw data recorded in the raw data DB 110. The raw data table stores raw data together with a timestamp, an individual ID, an IoT device ID, and a data ID.

The time stamp is information about the date and time for the raw data. The time stamp may be information about the date and time when the raw data is obtained by the IoT device 5 or may be information received together with the raw data from the IoT device 5. Also, the time stamp may be information about the date and time when the raw data is received by the raw data DB 110 from the IoT device 5.

The raw data DB 110 may store, in a manner associated with one another, multiple pieces of raw data received from multiple IoT devices 5 that have a common time stamp and a common individual ID. The raw data table may include multiple pieces of raw data with a common time stamp and a common individual ID recorded in a common row together with the corresponding IoT device ID.

In this manner, the raw data table associates the IoT device IDs and the raw data with the corresponding time stamps and individual IDs. The example raw data table shown in FIG. 3 includes two IoT device IDs, or specifically, an IoT device ID, Laboratory PC, for identifying a physical device, and an IoT device ID, a smiley face determination for PC representing the function of the device generating or collecting the raw data. The IoT device ID may be a number, a symbol, or a character string.

The data ID is information for identifying the raw data and is a unique ID for the raw data in each row of the raw data table. The data ID may be a number, a symbol, or a character string. As shown in FIG. 3, the data ID may be information about the operation history or the browsing history of Laboratory PC. The raw data DB 110 may identify raw data from the data ID and the time stamp when information about the operation history or the browsing history of a predetermined IoT device 5 is used as the data ID.

In this manner, the raw data DB 110 stores, in a manner associated with one another, information (user ID) obtained by Laboratory PC indicating a state or action of a user egaom03 at a date and time indicated by the time stamp, and information (face point group) relating to the facial expression of the user at the date and time indicated by the same time stamp.

The anonymized raw data DB 120 stores anonymized raw data, which is the raw data stored in the raw data DB 110 anonymized a predetermined number of manners. The anonymized raw data DB 120 may store, as anonymized data, the raw data stored in the raw data DB 110 without the individual ID for identifying an individual, and anonymized data obtained by averaging similar raw data stored in the raw data DB 110.

The preprocessor 130 generates preprocessed data by performing at least one preprocess on the target data, or the data collected in the raw data DB 110. The preprocessor 130 may perform various preprocesses using an algorithm corresponding to the type of target data to generate the preprocessed data. Also, the preprocessor 130 may perform, on the target data, such preprocesses using various algorithms corresponding to the respective preprocesses.

For example, the preprocessor 130 preprocesses the face point group data stored in the raw data DB 110 using a smiley face determination algorithm for converting the data to emotion data indicating the user's emotion. Also, the preprocessor 130 may perform another data preprocess of, for example, removing outliers from the value data for the raw data stored in the raw data DB 110.

Also, the preprocessor 130 functions as an algorithm manager that manages multiple preprocess algorithms. The preprocessor 130, which functions as the algorithm manager, registers a preprocess algorithm applicable to the target data to be preprocessed in response to a request from a user who intends to register the algorithm (registering user).

The preprocessor 130 holds the information about the raw data to be processed and generates the preprocessed data. Also, the preprocessor 130 functions as a preprocess ID assigner that assigns, to the preprocessed data, the preprocess ID corresponding to the preprocess performed on the raw data. Also, when a registered preprocess algorithm is implemented in response to a request from a registering user, the preprocessor 130 assigns, to the preprocessed data, the preprocess ID corresponding to the registration.

The analysis DB 140 stores the data preprocessed by the preprocessor 130. FIG. 4 is an example analysis data table storing the preprocessed data recorded in the analysis DB 140. The analysis data table stores the preprocessed data together with a time stamp, an individual ID, an IoT device ID, a data ID, and a preprocess ID for the raw data held by the preprocessor 130.

The anonymized analysis DB 160 stores the anonymized data preprocessed by the preprocessor 130. The anonymized analysis DB 160 delivers preprocessed anonymized data to a service provider with no limitation, in response to a request. The service provider can develop various services using the data provided by the anonymized analysis DB 160. In this manner, anonymizing the raw data obtained using each IoT device 5 for the anonymized data to be openly available to third party service providers can help service providers to develop service applications.

The user IoT data management DB 150 stores data for managing information and services provided to users through the visualization device 30 and the service providing device 20 (described later). The user IoT data management DB 150 may also perform a filtering process suitable for the details of the stored data.

FIG. 5A is a data management table for the visualization device 30 stored in the user IoT data management DB 150. FIG. 5B is a data management table for the service providing device 20 stored in the user IoT data management DB 150.

As shown in FIG. 5A, the data management table for the visualization device 30 stored in the user IoT data management DB 150 includes an IoT device ID, a data ID, a preprocess ID, and a visualization ID, which are all associated with an individual ID. The IoT device ID may be information for identifying the corresponding IoT device 5 permitted by the user identified by the individual ID to obtain raw data associated with the user. The data ID may be information for identifying raw data permitted by the user identified by the individual ID. The visualization ID may be information for identifying the visualization process performed on the raw data selected by the user identified by the individual ID, or specifically information such as the visualization ID indicating the visualization process (described in detail later) to be performed on the preprocessed data.

The user can change, add, and delete the IoT device ID, the data ID, and the visualization ID stored in the user IoT data management DB 150 by operating the terminal device 10 (described later). Also, the user may change, add, and delete the IoT device ID, the data ID, and the visualization ID stored in the user IoT data management DB 150 using the IoT device 5.

As shown in FIG. 5B, the data management table for the service providing device 20 stored in the user IoT data management DB 150 includes a service ID, a data ID, a preprocess ID, and a service trigger, which are all associated with an individual ID. The service ID is information for identifying the application permitted by the user identified by the individual ID to provide a service. The data ID is information for identifying the data referenced by the application permitted by the user to provide a service.

The service trigger is information indicating whether the service identified by the service ID is provided, or specifically, whether the service trigger is to be on or off, to the user identified by the individual ID. For example, when the user has not permitted the data identified by the data ID to be referenced by the application permitted by the user to provide a service, the service trigger is off. When the user has permitted the data identified by the data ID to be referenced by the application permitted by the user to provide a service, the service trigger is on.

The data management table for the service providing device 20 may include log information about data transmitted to the service providing device 20 by the user IoT data management DB 150.

In this manner, the user IoT data management DB 150 functions as a data associator that associates an IoT device 5 that generates target data with the owner of the data generated by the IoT device 5. Also, the user IoT data management DB 150 functions as an application associator that associates the owner of the data with an application that uses the data.

The user IoT data management DB 150 further generates a query for the owner of the data in accordance with the association between the application and the data and transmits the query to the terminal device 10 (described later). In one example, the user IoT data management DB 150 may run a query to authorize the association between the application and the data. In this manner, the user IoT data management DB 150 functions as a query unit that runs a query in accordance with the association between the application and the data. When the data to be used by the application is determined to be associated with an owner and the data to be used is owned by the owner, the user IoT data management DB 150 may query the owner about providing the data.

The user can change, add, and delete the service ID stored in the user IoT data management DB 150 through the terminal device 10 (described later). Also, the user may change, add, and delete the service ID stored in the user IoT data management DB 150 in response to a query from the user IoT data management DB 150.

In this manner, the user can change, add, and delete the IoT device ID, the data ID, the visualization ID, and the service ID through the terminal device 10, and can thus freely view, at any time, the details of the operation when associating the data with the service or when using or cancelling the service.

Visualization Device 30

The visualization device 30 visualizes, as a graph or in another form, at least one of data collected in the raw data DB 110 or data preprocessed by the preprocessor 130. The visualization device 30 provides visualized data to the terminal device 10 or another functional unit in the information processing system 1.

The visualization device 30 can perform various visualization processes. Also, multiple visualization devices 30 may be used to perform various visualization processes, and visualized data may be provided by the plurality of visualization devices 30 to the terminal device 10 or another functional unit in the information processing system 1. With known techniques, the receiver for the data can have no information about the visualization process performed on the data and the visualization device 30 that has performed the visualization process.

The visualization device 30 according to the present embodiment assigns, to the visualized data, a visualization process ID corresponding to the visualization process. In this manner, the receiver for the visualized data can have information about the visualization process performed on the data. Also, assigning the visualization process ID corresponding to the visualization device 30 that has performed the visualization process can inform the receiver for the visualized data of the visualization device 30 that has performed the visualization process.

The visualization device 30 generates visualized data by performing at least one visualization process on the target data collected in the raw data DB 110. The target data to be visualized by the visualization device 30 may be data stored in the raw data DB 110 or may be processed data stored in the analysis DB 140.

The visualization device 30 visualizes the target data as a graph or in another form. The visualization process for the target data performed by the visualization device 30 may be selected by the user operating the terminal device 10. The visualization device 30 may function as a visualization process ID assigner that assigns, to the visualized data, the visualization process ID corresponding to the visualization process.

Service Providing Device 20

The service providing device 20 stores the service IDs for identifying services to be provided. To provide a service with a predetermined service ID, the service providing device 20 obtains, from the user IoT data management DB 150, data to be referenced by the application providing the service. Also, the service providing device 20 delivers, to the terminal device 10, the service ID as well as the data ID of the data to be referenced by the service to be provided.

The service providing device 20 may deliver, to the terminal device 10, the data ID and the service ID in response to a request to provide a service with a predetermined service ID from the user operating the terminal device 10.

Terminal Device 10

The terminal device 10 receives a predetermined service by the user installing multiple applications on, for example, a smartphone, and opening an intended application. The terminal device 10 transmits and stores, to and into the user IoT data management DB 150, data identified by the IoT device ID, the data ID, the individual ID, the preprocess ID, and the visualization ID received from the visualization device 30 and data identified by the data ID and the service ID received from the service providing device 20.

The user can view the data visualized by the visualization device 30 with a visualization application installed on the terminal device 10 and receive a service provided by the service providing device 20 with a service application installed on the terminal device 10. Multiple visualization applications and multiple service applications may be installed on the terminal device 10. Each of the applications references multiple pieces of data.

In this manner, each of the applications installed on the terminal device 10 references multiple pieces of data. Thus, the user may desire to easily manage these applications and the data through the terminal device 10.

The terminal device 10 includes a display 15. The terminal device 10 functions as an image data generating device that generates image data to display on the display 15. Also, the terminal device 10 includes an information obtainer 11 and a data candidate information obtainer 12. Also, the terminal device 10 includes a display screen generator 13.

The information obtainer (application information obtainer) 11 obtains application information indicating an application to appear on the display 15.

The data candidate information obtainer 12 obtains data candidate information indicating a candidate for data to be referenced by the application.

Figure 9:
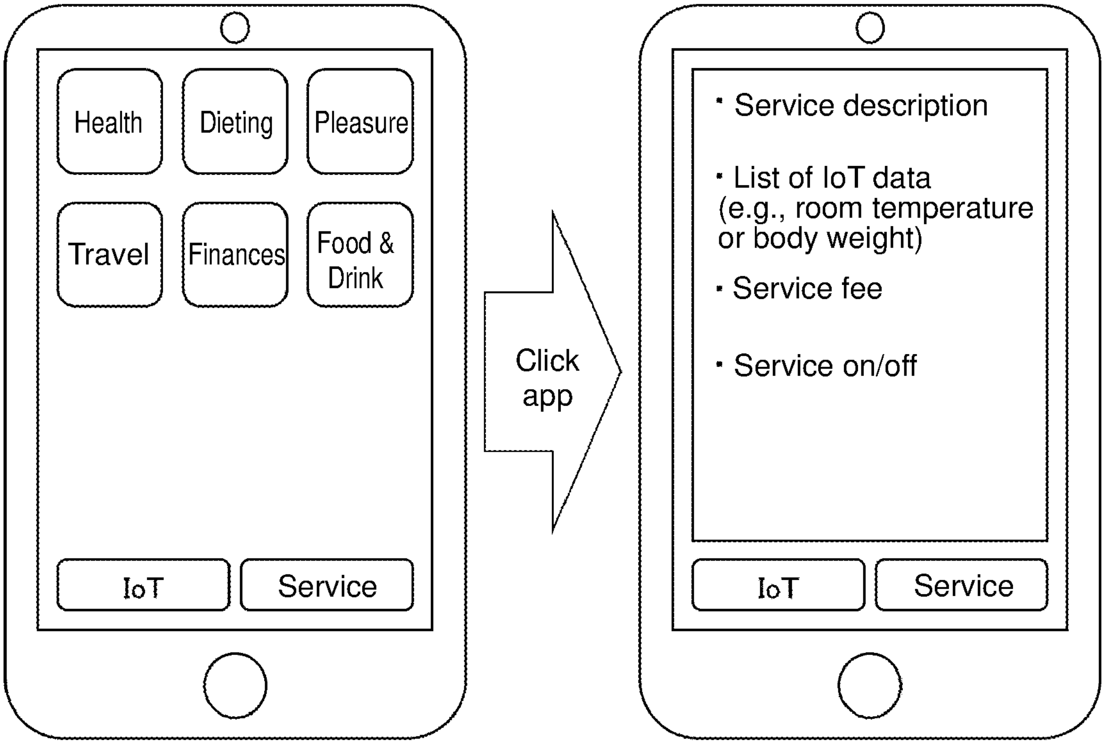
FIG. 9 is a diagram illustrating example screens each displaying an output from a service providing device on a terminal device.

As described later with reference to FIG. 9, the display screen generator 13 generates one or more display screens including a list of application icons indicating application information and a list of data candidates indicating data candidate information.

In this manner, the data used by the terminal device 10 and the user IoT data management DB 150 includes the IoT device ID, the preprocess ID, and the visualization ID. A user receiving a service or information through the terminal device 10 and a service provider that references the data stored in the user IoT data management DB 150 to provide a service can thus track data records including the data source and the processes performed on the data.

Also, a list of application icons and a list of data candidates referenced by the application appear on the terminal device 10. Thus, the user can easily select an application and turn on or off the data referencing capability. Thus, the user can easily determine the current state of the applications and the referencing data, and can also control the data through the terminal device 10.

Processing Performed by Information Processing System 1

Figure 6:
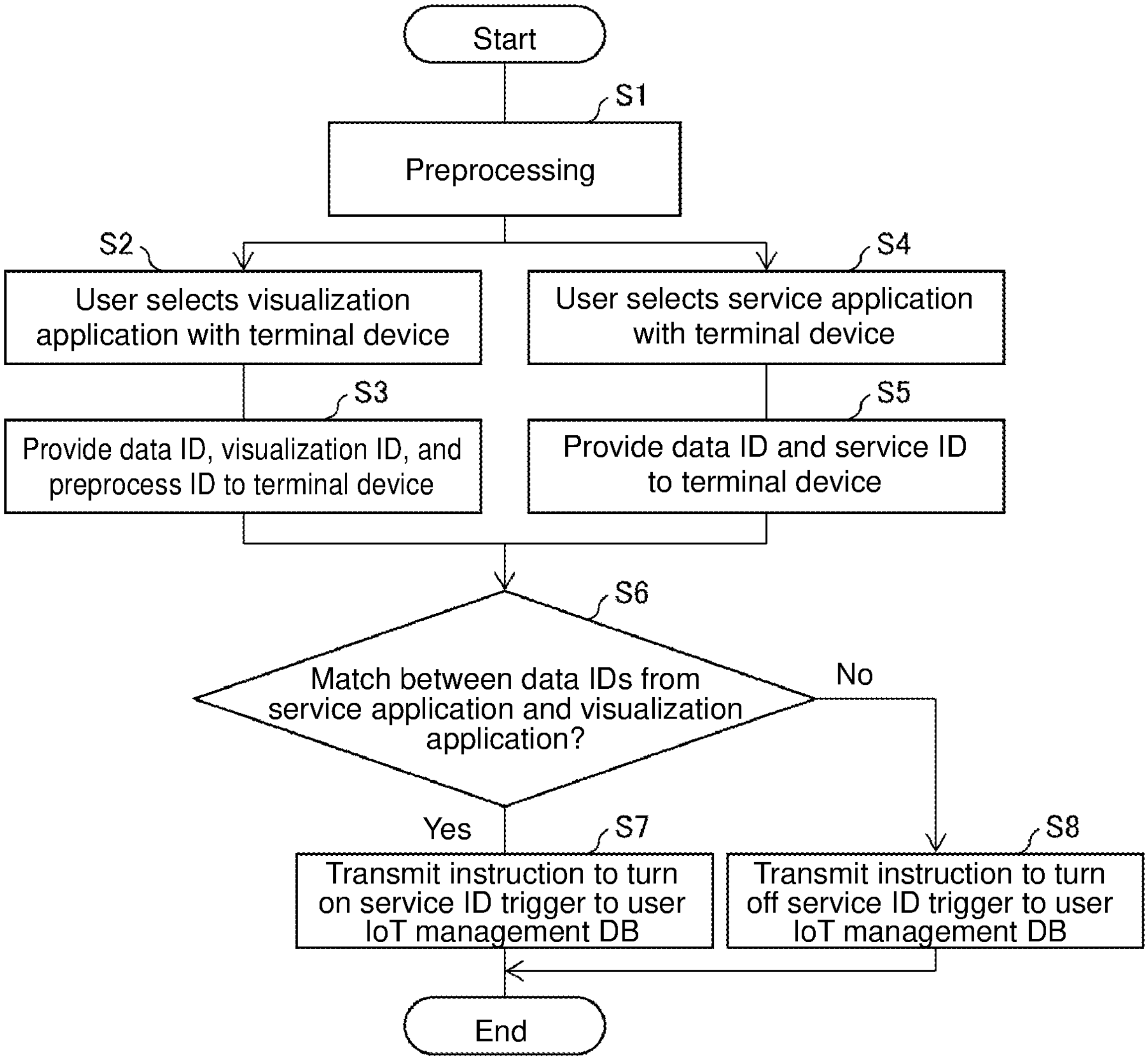
FIG. 6 is a diagram illustrating a flowchart of a service authorization process.
Figure 8:
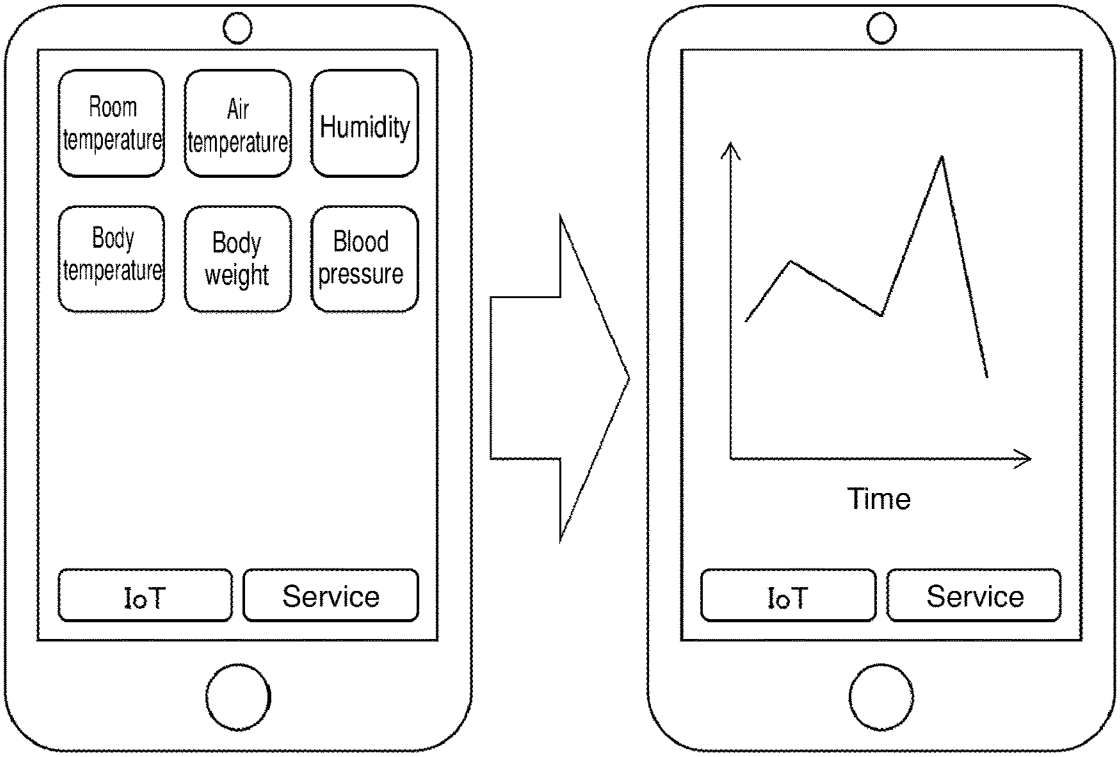
FIG. 8 is a diagram illustrating example screens each displaying an output from a visualization device on a terminal device.

FIG. 6 is a flowchart showing the processing performed by the information processing system 1. Fig. 8 is a diagram of example screens on the display 15 when the visualization application is selected with the terminal device 10. Fig. 9 is a diagram of example screens on the display 15 when the service application is selected with the terminal device 10.

The data obtained by the IoT device 5 may include data that the user does not intend to collect or use. Also, the user may use a service with a service application that references data unintended to be collected or used without noticing such data. Thus, a demand is increasing for techniques that block an authorized user from using a service application that references data unintended to be collected or used by the user.

Step S1

In response to data received from the IoT device 5, the information processing device 100 preprocesses the received data with the preprocessor 130.

Step S2

A user selects a visualization application with the terminal device 10. As shown in FIG. 8, the user selects an intended visualization application from the list of application icons appearing on the display 15 in the terminal device 10 by touching, for example, a touchscreen panel. The data visualized by the selected visualization application appears on the display 15 in the terminal device 10. For example, when the visualization application for visualizing data relating to air temperature is selected, a line graph that illustrates the change in air temperature over time appears on the display 15 in the terminal device 10.

Step S3

In response to the user selecting a visualization application, the visualization device 30 provides, to the terminal device 10, the data ID, the visualization ID, and the preprocess ID of the data referenced by the selected visualization application. The data ID of the data provided to the terminal device 10 by the visualization device 30 and referenced by the visualization application visualizing the data is referred to as a first data ID. The information processing system 1 includes the terminal device 10 that functions as a first data ID obtainer that obtains the first data ID.

Step S4

After the preprocess performed by the preprocessor 130, the user selects a service application with the terminal device 10. As shown in FIG. 9, the display screen generator 13 generates one or more screens including a screen listing application icons indicating application information and a screen listing data candidates indicating data candidate information. The user selects an intended service application from the list of application icons appearing on the display 15 in the terminal device 10 by touching, for example, the touchscreen panel. In response to the user selecting a service application, a service to be provided with the selected application and a list of data candidates referenced by the application appear on the display 15 in the terminal device 10.

Step S5

In response to the user selecting a service application, the service providing device 20 provides, to the terminal device 10, the service ID of the selected service application and the data ID of data referenced by the service application to be provided to the user. The data ID provided to the terminal device 10 by the service providing device 20 and referenced by the service application is referred to as a second data ID. The information processing system 1 includes the terminal device 10 that functions as a second data ID obtainer that obtains the second data ID.

Step S6

The terminal device 10 determines whether the first data ID provided by the visualization device 30 matches the second data ID provided by the service providing device 20. When the first data ID and the second data ID match (Yes in step S6), the terminal device 10 advances to step S7. When the first data ID and the second data ID do not match (No in step S6), the terminal device 10 advances to step S8.

Step S7

The terminal device 10 transmits, to the user IoT data management DB 150, an instruction to turn on the trigger of the service ID provided by the service providing device 20. When the trigger of the service ID is turned on in the user IoT data management DB 150, the service application that references data associated with the second data ID can be used. In this manner, when the first data ID and the second data ID match, the terminal device 10 functions as an output unit that outputs information indicating that the service application that references data associated with the second data ID can be used.

Step S8

The terminal device 10 transmits, to the user IoT data management DB 150, an instruction to turn off the trigger of the service ID provided by the service providing device 20. When the trigger of the service ID is turned off in the user IoT data management DB 150, the service application that references data associated with the second data ID cannot be used.

In this manner, turning on or off the trigger of the service ID causes the user IoT data management DB 150 to function as an application use controller that controls use of the service applications.

This configuration enables control on the use of the service applications by determining whether the first data ID, which is the ID of data indicating a user intention for visualization, matches the second data ID, which is the ID of data referenced by the service application intended to be used by the user. This configuration does not allow use of service applications that reference data unintended by the user.

Figure 7:
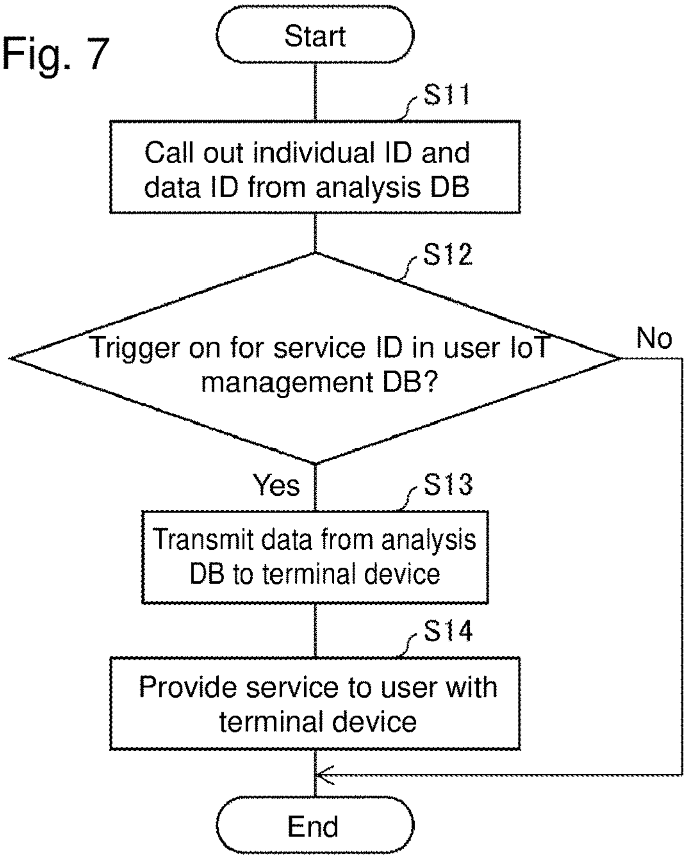
FIG. 7 is a diagram illustrating a flowchart of a service providing process.

Processing Flow of Information Processing System 1 for Providing Service to User FIG. 7 is a flowchart showing the processing performed by the information processing system 1 for providing a service to a user.

Step S11

In response to the user selecting a service application by operating the terminal device 10, the user IoT data management DB 150 references the individual ID of the user associated with the terminal device 10 and calls out the data associated with the individual ID from the analysis DB 140.

Step S12

The user IoT data management DB 150 determines whether the trigger of the service ID indicating the service application selected by the user is on. When the trigger is determined to be on (Yes in step S12), the user IoT data management DB 150 advances to step S13. When the trigger is determined to be off (No in step S12), the user IoT data management DB 150 ends the processing.

Step S13

The user IoT data management DB 150 transmits the data called out from the analysis DB 140 to the terminal device 10 through the service providing device 20.

Step S14

The service based on the data called out from the analysis DB 140 is provided to the terminal device 10 through the service application selected by the user.

In the present embodiment, the analysis DB 140 may be eliminated. The information processing system 1 without the analysis DB 140 may sequentially transmit the data preprocessed by the preprocessor 130 to at least one of the user IoT data management DB 150, the visualization device 30, or the terminal device 10.

Figure 10:
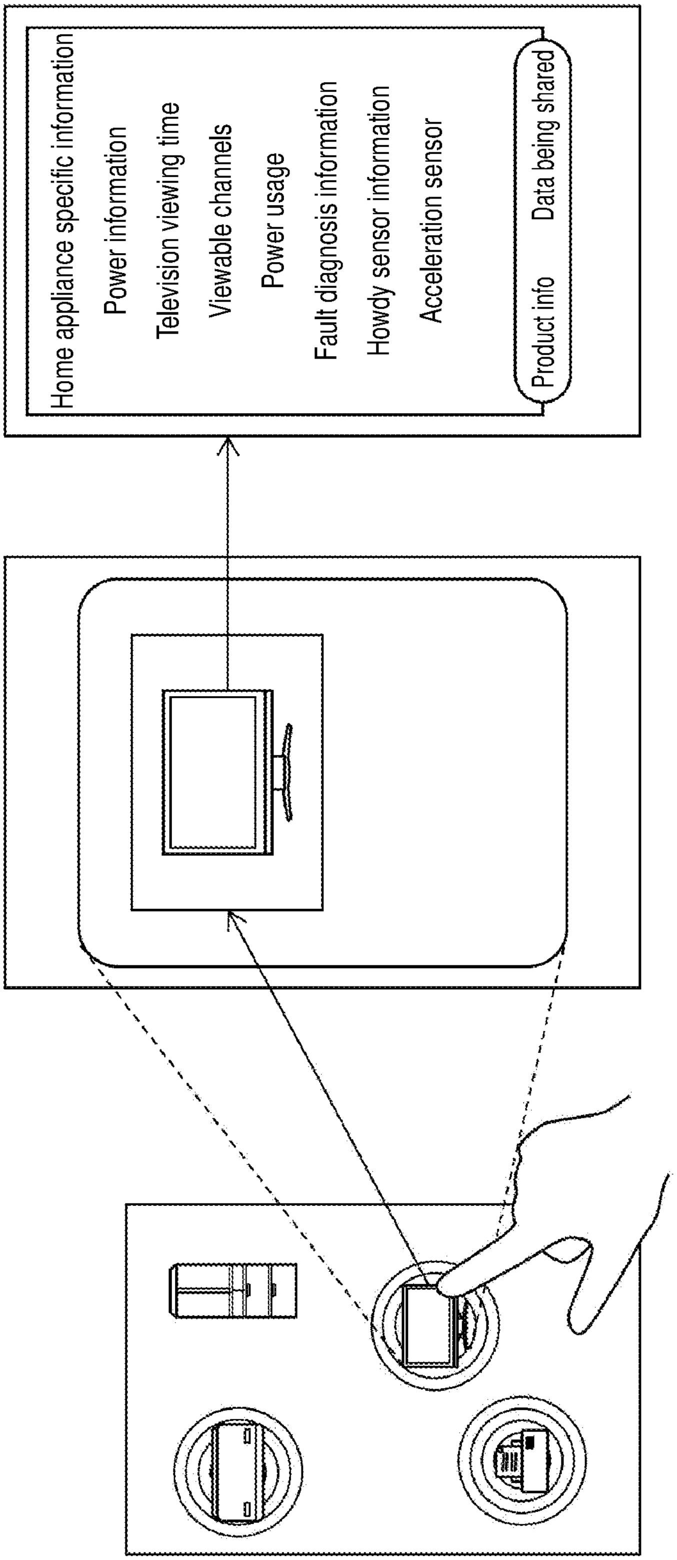
FIG. 10 is a diagram illustrating example screens each displaying an output from a visualization device on a terminal device.

FIG. 10 is a diagram showing a list of application icons and a list of data candidates appearing on the display 15 in the terminal device 10. The user operating the terminal device 10 can install the visualization application and service application from an application store to use the functions of the applications. The user can select an intended application in an application store from multiple service-providing applications and install the intended application on the terminal device 10. The user can also uninstall the application installed on the terminal device 10 by operating the terminal device 10.

As shown in FIG. 10, the terminal device 10 may be paired with the IoT device 5 to allow an application that references data obtained by the IoT device 5 to be usable. For example, an icon of the IoT device 5, or for example, an indoor electronic device to be paired, may appear on the display 15 in the terminal device 10. The user can operate the terminal device 10 to select the IoT device 5 and pair the terminal device 10 with the IoT device 5.

For example, the user can pair the terminal device 10 with an IoT device 5 that is a television. A list of application icons relating to the paired television appears on the display 15 in the terminal device 10. Also, a list of data candidates referenced by the application, or for example, power information, the viewing time, viewable channels, and power usage appears on the display 15 in the terminal device 10.

In this manner, the user can easily pair the terminal device 10 with the IoT device 5 and can easily select an application from the plurality of applications that reference the data obtained by the IoT device 5 and easily select the data to be referenced.

Implementations Using Software

The functions of the information processing device 100 may be implemented using logic circuits (hardware) on an integrated circuit (IC chip) or may be implemented using software.

When using software for implementing each function, the information processing device 100 includes a computer for executing instructions included in a program from the software. The computer includes, for example, one or more processors and a computer-readable recording medium storing the program. The processor in the computer reads the program from the recording medium and executes the program to achieve the aspects of the present invention. The processor is, for example, a central processing unit (CPU).

The recording medium may be a non-transitory tangible medium, such as a read-only memory (ROM), a tape, a disk, a card, a semiconductor memory, or a programmable logic circuit. The computer may additionally include a random-access memory (RAM) for expanding the program. The program may be provided through any transmission medium that can transmit the program to the computer (e.g., a communication network or a broadcast wave). One aspect of the present invention may be a data signal superimposed on a carrier wave representing the program through electronic transmission.

Overview

An information processing device according to an aspect of the present invention is an information processing device for processing target data. The device includes a preprocessor that generates preprocessed data by performing at least one preprocess on the target data, and a preprocess ID assigner that assigns, to the preprocessed data, a preprocess ID corresponding to the at least one preprocess.

In this structure, at least one preprocess is performed on the target data, and the preprocess ID corresponding to the at least one preprocess is assigned to the preprocessed data. Thus, information about the preprocess performed on the data can be obtained in a postprocess or use of the data, allowing the data records to be tracked.

An information processing device according to another aspect of the present invention is an information processing device for visualizing target data. The device includes a visualization unit that generates visualized data by performing at least one visualization process on the target data, and a visualization process ID assigner that assigns, to the visualized data, a visualization process ID (also referred to as a visualization ID) corresponding to the at least one visualization process.

In this structure, at least one visualization process is performed on the target data, and the visualization process ID corresponding to the at least one visualization process is assigned to the visualized data. Thus, information about the visualization performed on the data can be obtained in a postprocess or use of the data, allowing the data records to be tracked.

The information processing device according to the above aspect of the present invention further includes an algorithm manager that manages a plurality of preprocess algorithms. The algorithm manager registers a preprocess algorithm applicable to the target data in response to a request from a registering user. The preprocess ID assigner assigns a preprocess ID corresponding to the registration to the registered preprocess algorithm.

In this structure, the registering user can register a preprocess algorithm in the information processing device, and the preprocess ID corresponding to the registration is assigned to the preprocessed data. Thus, information about the preprocess performed on the data can be obtained in a postprocess or use of the data, allowing the data records to be tracked.

The information processing device according to the above aspect of the present invention further includes a data associator that associates a data generating device with an owner of data generated by the data generating device, an application associator that associates the owner of the data with an application that uses the data, and a query unit that runs a query for the owner of the data in accordance with an association between the application and the data.

This structure prevents the service application from referencing data without being noticed by the user. The association between the data and the service application to use or not to use the data is determined while the user is being aware of its data ownership.

An image data generating device according to another aspect of the present invention is an image data generating device for generating image data. The device includes an application information obtainer that obtains application information indicating an application to display, a data candidate information obtainer that obtains information indicating a candidate for data referenced by the application, and a display screen generator that generates one or more display screens including a list of application icons indicating the application information and a list of data candidates indicating the data candidate information.

In this structure, the application and the data referenced by the application appear on the display screen. Thus, the user can easily view the application and the details of the data referenced by the application.

An information processing device according to another aspect of the present invention is an information processing device for controlling use of an application. The device includes a first data ID obtainer that obtains a first data ID being an ID of first data referenced by a visualization application for visualizing data, a second data ID obtainer that obtains a second data ID being an ID of second data referenced by a service application provided to a user, and an output unit that outputs information indicating that the service application that references the second data is usable in response to a match between the first data ID and the second data ID.

In this structure, the service application that references the same data as referenced by the visualization application becomes usable. This structure prevents the service application from referencing unvisualized data without being noticed by the user. The association between the data and the service application to use or not to use the data is determined while the user is being aware of its data ownership.

An information processing system according to another aspect of the present invention includes a visualization ID assigner, and an application use controller that controls use of an application. The visualization ID assigner includes a visualization unit that generates visualized data by performing at least one visualization process on target data, and a visualization process ID assigner that assigns, to the visualized data, a visualization process ID corresponding to the at least one visualization process. The application use controller includes a first data ID obtainer that obtains a first data ID being an ID of first data referenced by the visualization ID assigner, a second data ID obtainer that obtains a second data ID being an ID of second data referenced by a service application provided to a user, and an output unit that outputs information indicating that the service application that references the second data is usable in response to a match between the first data ID and the second data ID.

In this structure, the service application that references the same data as referenced by the visualization application becomes usable. This structure prevents the service application from referencing unvisualized data without being noticed by the user. The association between the data and the service application to use or not to use the data is determined while the user is being aware of its data ownership.

An information processing method according to another aspect of the present invention is an information processing method for processing target data. The method includes generating preprocessed data by performing at least one preprocess on the target data, and assigning, to the preprocessed data, a preprocess ID corresponding to the at least one preprocess.

With this method, at least one preprocess is performed on the target data, and the preprocess ID corresponding to the at least one preprocess is assigned to the preprocessed data. Thus, information about the preprocess performed on the data can be obtained in a postprocess or use of the data, allowing the data records to be tracked.

An information processing method according to another aspect of the present invention is an information processing method for visualizing target data. The method includes generating visualized data by performing at least one visualization process on the target data, and assigning, to the visualized data, a visualization process ID corresponding to the at least one visualization process.

With this method, at least one visualization process is performed on the target data, and the visualization process ID corresponding to the at least one visualization process is assigned to the visualized data. Thus, information about the visualization performed on the data can be obtained in a postprocess or use of the data, allowing the data records to be tracked.

An image data generating method according to another aspect of the present invention is an image data generating method for generating image data. The method includes obtaining application information indicating an application to display, obtaining information indicating a candidate for data referenced by the application, and generating one or more display screens including a list of application icons indicating the application information and a list of data candidates indicating the data candidate information.

With this method, the application and the data referenced by the application appear on the display screen. Thus, the user can easily view the application and the details of the data referenced by the application.

A program according to another aspect of the present invention is a program for causing a computer to function as the information processing device described above. The program causes the computer to function as the preprocessor and the preprocess ID assigner.

With this program, the history of the preprocess performed on the data can be tracked.

A program according to another aspect of the present invention is a program for causing a computer to function as the information processing device described above. The program causes the computer to function as the visualization unit and the visualization process ID assigner.

With this program, the history of the visualization performed on the data can be tracked.

A program according to another aspect of the present invention is a program for causing a computer to function as the image data generating device described above. The program causes the computer to function as the application information obtainer, the data candidate information obtainer, and the display screen generator.

With this program, the application and the data referenced by the application can appear on the display screen. Additionally, an information processing device may be embodied as follows. An information processing device for controlling use of an application according to one or more embodiments may include a first data ID obtainer configured to obtain a first data ID being an ID of first data referenced by a visualization application for visualizing data; a second data ID obtainer configured to obtain a second data ID being an ID of second data referenced by a service application provided to a user; and an output unit configured to output information indicating that the service application that references the second data is usable in response to a match between the first data ID and the second data ID. An information processing system according to one or more embodiments may include: a visualization ID assigner; and an application use controller configured to control use of an application. The visualization ID assigner may include a visualization unit configured to generate visualized data by performing at least one visualization process on target data, and a visualization process ID assigner configured to assign, to the visualized data, a visualization process ID corresponding to the at least one visualization process. The application use controller may include a first data ID obtainer configured to obtain a first data ID being an ID of first data referenced by the visualization ID assigner, a second data ID obtainer configured to obtain a second data ID being an ID of second data referenced by a service application provided to a user, and an output unit configured to output information indicating that the service application that references the second data is usable in response to a match between the first data ID and the second data ID. An information processing method for processing target data according to one or more embodiments may include generating preprocessed data by performing at least one preprocess on the target data; and assigning, to the preprocessed data, a preprocess ID corresponding to the at least one preprocess. An information processing method for visualizing target data according to one or more embodiments may include generating visualized data by performing at least one visualization process on the target data; and assigning, to the visualized data, a visualization process ID corresponding to the at least one visualization process. An image data generating method for generating image data according to one or more embodiments may include obtaining application information indicating an application to display; obtaining data candidate information indicating a candidate for data referenced by the application; and generating one or more display screens including a list of application icons indicating the application information and a list of data candidates indicating the data candidate information. A non-transitory computer-readable storage medium may be provided that stores a program, which when read and executed, causes a computer to perform operations, which may include operation as the preprocessor, and operation as the preprocess ID assigner in the information processing device according to one or more embodiments described above. A non-transitory computer-readable storage medium may be provided that stores a program, which when read and executed, causes a computer to perform operations, which may include operation as the visualization unit, and operation as the visualization process ID assigner in the information processing device according to one or more embodiments described above A non-transitory computer-readable storage medium may be provided that stores a program, which when read and executed, causes a computer to perform operations, which may include operation as the application information obtainer, operation as the data candidate information obtainer, and operation as the display screen generator in the image data generating device according to one or more embodiments described above.

The embodiments disclosed herein should not be construed to be restrictive, but may be modified within the spirit and scope of the claimed invention. The technical features disclosed in the embodiments may be combined in other embodiments within the technical scope of the invention.

The invention claimed is:

1. An information processing device for processing target data, the device comprising a processor configured with logic or a program to perform operations comprising:

collecting raw data generated from one or more data generating devices as the target data, each of the one or more data generating devices having a different device ID, which is assigned to the raw data generated therefrom;

storing each piece of the collected raw data in association with a data ID and the device ID of the device from which the piece of raw data was collected;

providing a service and a service application to a terminal capable of being coupled to the information processing device, the service referencing at least one piece of the target data;

operation as a preprocessor configured to generate preprocessed data by performing at least one preprocess on the target data; and operation as a preprocess ID assigner configured to assign, to the preprocessed data, a preprocess ID corresponding to the at least one preprocess, and determine whether the preprocessed data is usable with the provided service application in accordance with at least one of the device ID and the preprocess ID.

2. The information processing device according to claim 1, wherein the processor is configured with the logic or the program to perform operations further comprising:

operation as an algorithm manager configured to manage a plurality of preprocess algorithms, wherein the processor is configured with the logic or the program to perform operations such that:

operation as the algorithm manager comprises registering a preprocess algorithm applicable to the target data in response to a request from a registering user, and operation as the preprocess ID assigner comprises assigning a preprocess ID corresponding to a registration to the registered preprocess algorithm.

3. The information processing device according to claim 2, wherein the processor is configured with the logic or the program to perform operations further comprising:

operation as a data associator configured to associate each of the one or more data generating devices with an owner of data generated by the respective data generating device;

operation as an application associator configured to associate the owner of the data generated by the respective data generating device with an application that uses the data; and operation as a query unit configured to run a query for the owner of the data in accordance with an association between the application and the data.

4. An information processing device for visualizing target data, the device comprising a processor configured with logic or a program to perform operations comprising:

receiving, as the target data, raw data generated from one or more data generating devices from a storage in which each piece of the raw data is stored in association with a data ID, or preprocessed data from a preprocessor that preprocesses the raw data and assigns a preprocess ID to the processed data;

operation as a visualization unit configured to generate visualized data by performing at least one visualization process on the target data;

operation as a visualization ID assigner configured to assign, to the visualized data, a visualization ID corresponding to the at least one visualization process;

receiving an indication of a selection of a visualization application from a terminal device, the selected visualization application referencing target data to be visualized; and providing to the terminal device, in response to receiving the indication, the visualization ID, and the data ID or the preprocess ID of the target data referenced by the visualization application.

5. An image data generating device for generating image data, the device a processor configured with logic or a program to perform operations comprising:

operation as an application information obtainer configured to obtain application information indicating an application to display, the application referencing one or more pieces of target data generated from one or more data generating devices, each of the one or more data generating devices having a different device ID, which is assigned to the target data generated therefrom, each piece of the target data associated with a data ID and the device ID of the device generating the piece of target data;

operation as a data candidate information obtainer configured to obtain data candidate information indicating a candidate for the data referenced by the application;

operation as a display screen generator configured to generate one or more display screens including a list of application icons indicating the application information and a list of data candidates indicating the data candidate information including the data IDs of each of the data candidates;

receiving a selection of one of the application icons and the list of the data candidates and providing the selection to an information processing device; and obtaining from the information processing device, in response to providing the selection, the data ID or the preprocess ID of the data candidates referenced by the application.

* * * * *